United States Patent [19]

Visser

[11] 4,089,253

[45] May 16, 1978

[54] LINEAR FLUID MOTOR

[75] Inventor: Peter J. Visser, Niles, Mich.

[73] Assignee: Clark Equipment Company, Buchanan, Mich.

[21] Appl. No.: 746,450

[22] Filed: Dec. 1, 1976

[51] Int. Cl.² .......................... F16J 15/18; F16J 1/14
[52] U.S. Cl. ........................................ 92/168; 92/179; 92/187; 92/255; 403/343
[58] Field of Search ................. 92/167, 255, 256, 257, 92/258, 259, 187, 188, 189, 190, 179, 168; 403/343, 119, 118

[56] References Cited

U.S. PATENT DOCUMENTS

| | | | |
|---|---|---|---|
| 373,072 | 11/1887 | Jarvis | 92/167 |
| 680,465 | 8/1901 | Reynolds | 92/258 |
| 1,471,820 | 10/1923 | Beam | 92/167 |
| 2,188,957 | 2/1940 | Pfauser | 92/258 |
| 2,758,897 | 8/1956 | Naab | 403/316 |
| 3,293,993 | 12/1966 | Lanham | 91/396 |
| 3,311,030 | 3/1967 | Halstead | 92/167 |
| 3,885,461 | 5/1975 | Crisp et al. | 92/255 |
| 3,994,604 | 11/1976 | Visser | 403/343 |

Primary Examiner—Paul E. Maslousky
Attorney, Agent, or Firm—Kenneth C. Witt

[57] ABSTRACT

A fluid operated linear motor of the piston and cylinder type. The piston is secured to a rod by a threaded connection and the mating threads are proportioned and dimensioned so that pivotal movement available in the threaded connection is enough to compensate at least in part for manufacturing tolerances and eccentricities and prevent or reduce abnormal distribution of lateral forces by the piston on the outer cylinder.

6 Claims, 10 Drawing Figures

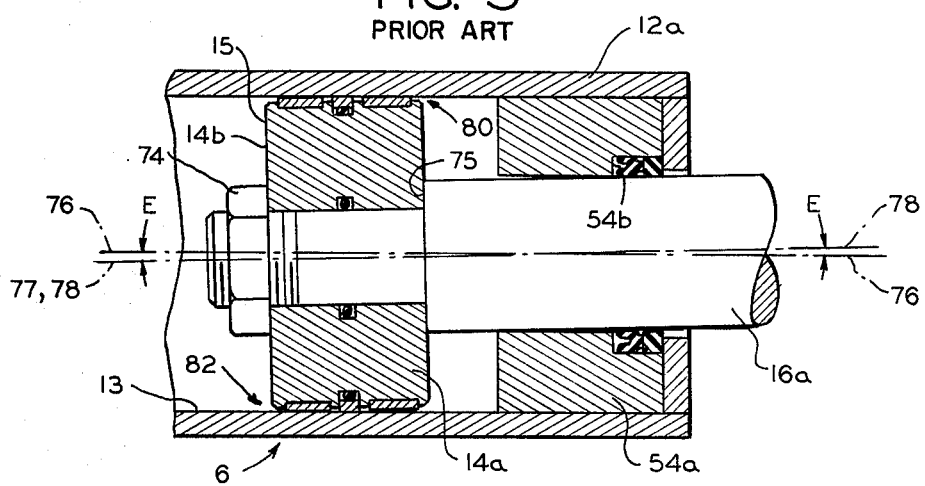
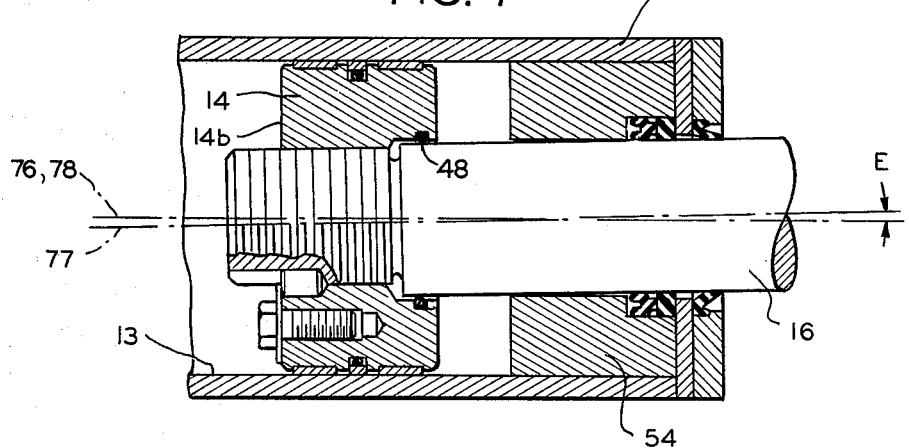
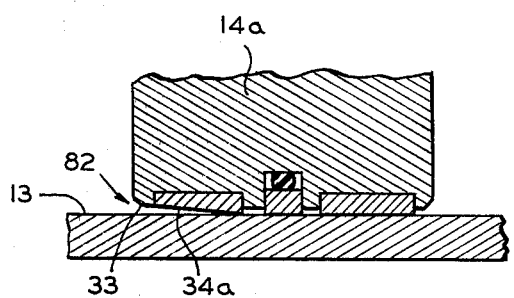
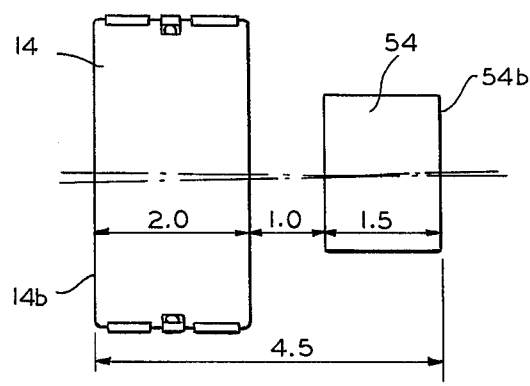

LINEAR FLUID MOTOR

BACKGROUND OF THE INVENTION

1. Field of the Invention

This invention relates to a linear fluid motor comprising a piston mounted on a rod and arranged for the piston to reciprocate in an outer cylinder member, and more specifically to such a motor which is hydraulically operated.

2. Description of the Prior Art

Linear hydraulic motors are utilized in a variety of applications in machines and vehicles to accomplish power operation and/or remote control of parts and components, the operation or remote control being accomplished by an operator controlling the supply of pressurized hydraulic fluid to the motor from a valve at an operator's station.

Various constructions have been utilized for securing the piston to the rod end in such motors and one of these is a threaded or screw type connection. One form of screw type connection comprises internal threads in an opening through the center of the piston and mating external threads on the rod which extends through the piston. Another known form of screw type connection uses a threaded engagement between external threads on the rod and internal threads on a lock nut which is disposed adjacent to the piston and bears against it, holding it in the desired position on the rod.

Such motors may be subject to frequent operation and may operate at pressures of 2500 pounds per square inch or more. In such motors manufactured heretofore with normal tolerances and clearances there have been various problems and among the most serious are the problems caused by abnormal distribution of lateral forces resulting from misalignment between the piston and cylinder during some conditions of operation. Such misalignment increases the friction, may cause noise, may allow dirt to be trapped, and cause undue wear of the piston and/or cylinder, and leaking.

Numerous constructions have been utilized heretofore in an attempt to provide a suitable connection between the piston and rod of a linear hydraulic motor and in many of such constructions it has been attempted to secure and hold the piston and rod rigidly together so that they act as an integral reciprocal member, even though such a rigid connection serves to perpetuate any initial misalignment. With normal or even extraordinary manufacturing tolerances the alignment of the piston on the rod and the piston with the cylinder is not perfect, when the piston and rod are rigidly connected together, and the result is abnormal distribution of lateral forces between the piston and cylinder under some circumstances with the resulting deleterious consequences.

SUMMARY OF THE INVENTION

In carrying out this invention in a preferred form I provide a linear fluid motor of the piston and cylinder type in which the piston is secured to the rod by a screw connection comprising internal threads on the piston and the mating external threads on the piston rod. The two sets of threads are proportioned and dimensioned so that pivotal movement of the piston rod relative to the piston is allowed which is sufficient to prevent or reduce abnormal distribution of lateral forces by the piston on the cylinder during normal reciprocal operation of the motor.

BRIEF DESCRIPTION OF THE DRAWING

FIG. 5 is a schematic view illustrating a prior art motor,

FIG. 6 is a fragmentary view in section of the portion of FIG. 5 indicated at 6, FIG. 7 is a schematic view of the present invention, FIG. 8 is a diagram which is illustrative of the present invention.

DESCRIPTION OF THE PREFERRED EMBODIMENT

Figure 1:
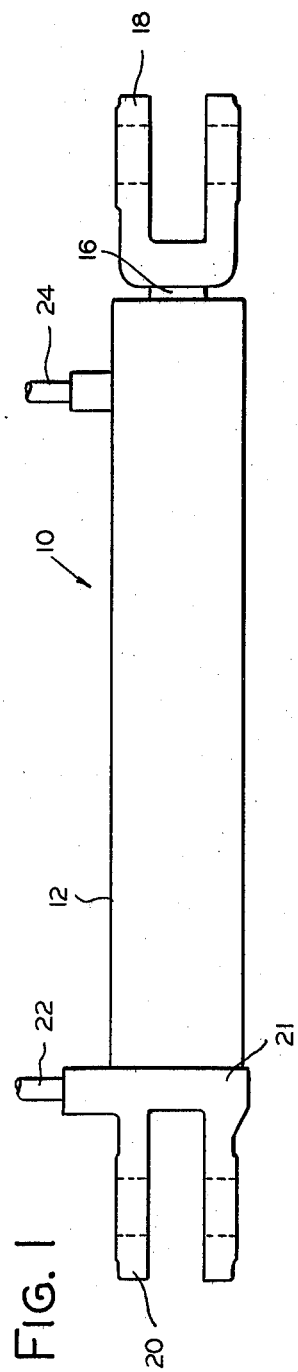
FIG. 1 of the drawing is a plan view of a linear fluid motor according to the present invention in its fully retracted position.

Referring to the drawing, the numeral 10 in FIG. 1 and other figures indicates generally a linear fluid motor in accordance with this invention. The motor 10 includes an outer cylinder member 12, a piston 14 (see FIG. 3) of circular cross section which reciprocates in the cylinder, the piston 14 being mounted on a rod 16. As shown, the motor 10 has a bifurcated portion 18 on rod 16 for connecting the motor to one portion of the device or component which is to be operated by the motor while another bifurcated portion 20 is rigidly secured as by welding to cylinder 12, the portion 20 having provision for connecting the motor to the other portion of the device or component which is to be operated by the motor 10.

There are provisions for attaching a hydraulic conduit 22 for admitting hydraulic fluid to and discharging it from the base structure 21 at the head end of the motor 10, the head end being the left end in FIG. 1, opposite the rod end. At the rod end of the motor provision is made for attaching a conduit 24 to admit hydraulic fluid to and discharge it from the rod end of the motor. It will be understood by those skilled in the art that the motor 10 illustrated is a double acting device in which the admission of pressurized hydraulic fluid at the rod end through conduit 24 and simultaneously discharging fluid from the head end through conduit 22 moves the motor toward its retracted condition illustrated in FIG. 1. The admission of pressurized hydraulic fluid to the head end through conduit 22 and the consequent discharge of hydraulic fluid from the rod end through conduit 24 moves the motor from its retracted condition of FIG. 1 to or toward its fully extended condition of FIG. 2.

Figure 2:
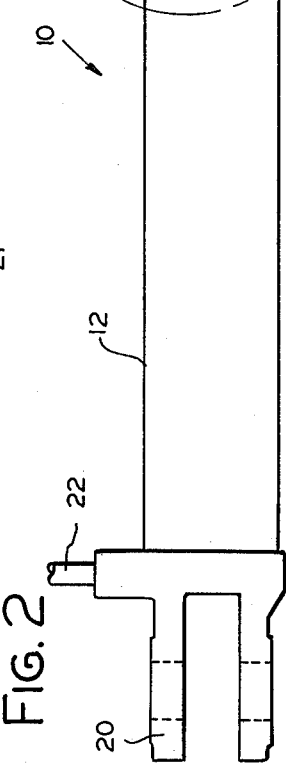
FIG. 2 is a view similar to FIG. 1 except with the motor in the fully extended position.
Figure 3:
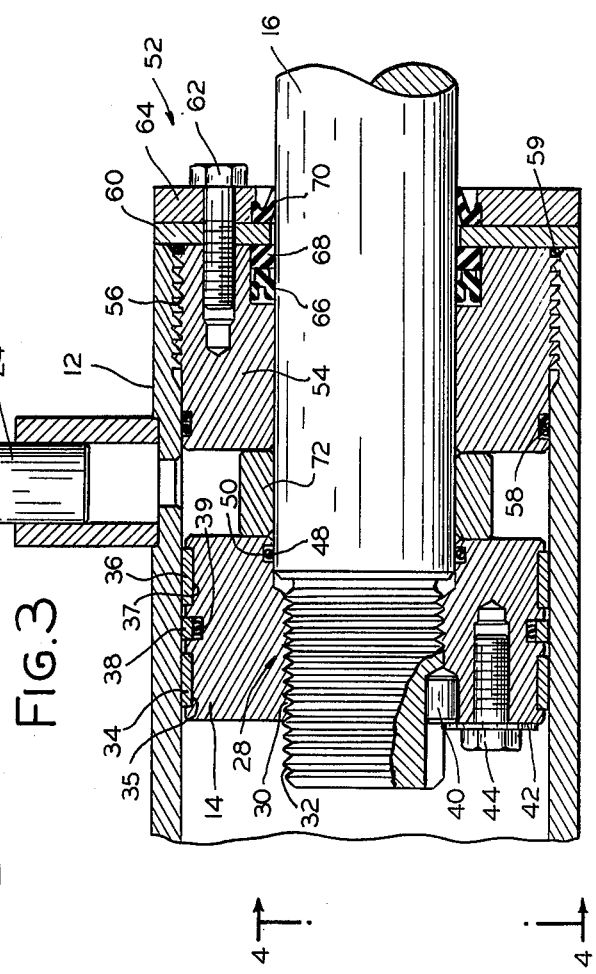
FIG. 3 is a fragmentary sectional view showing the portion indicated by the numeral 3 on FIG. 2.

FIG. 3 of the drawing is a fragmentary view partially in section showing a portion of the cylinder 12, a portion of the rod 16 and the piston 14, all in the fully extended condition of FIG. 2. This position of the motor is also referred to as the minimum retainment position because in this position the minimum amount of the rod 16 is retained in the cylinder 12. It is in this minimum retainment position that axially directed or other forces acting on the motor have the most serious effect internally on the piston and cylinder and this is explained in greater detail hereafter.

As shown in FIG. 3, the motor 10 includes piston 14 which is mounted on rod 10 by means of a screw connection at 28. The connection 28 comprises internal threads 30 in the piston 14 and mating external threads 32 on the rod 16. Around the outer periphery of the piston 26 is a pair of wear rings 34 and 36 located in grooves 35 and 37 respectively, with a circular seal 38 and preloading back up ring 39 located between the wear rings.

The piston 26 is not screwed tightly on the rod as in some prior art constructions nor is it held by means of a lock nut which is screwed tightly on the rod as in other prior art constructions, one of which is depicted in FIG. 5. In FIG. 5 a piston indicated at 14a is clamped between a nut 74 and a shoulder portion 75 on the shaft and thus the piston is rigidly mounted on the shaft. In the structure of FIG. 5 the nut 74 is torqued so that the axial force produced on the piston at least equals and preferably exceeds the force produced on the left end surface of the piston 14a by the hydraulic pressure in the motor during operation. Such torquing of the lock nut or its removal requires tools which may not be readily available, particularly if repairs are required in the field.

Figure 4:
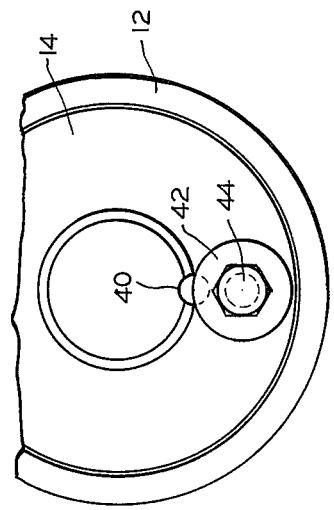
FIG. 4 is a view along the line 4—4 of FIG. 3.

In the present invention the piston is assembled on the rod without the need for such torquing, in a manner which is explained in detail hereafter, and is held in that position so that it cannot come off or undergo any unscrewing action at all, by means of a retaining pin 40 which is positioned in mating grooves, one in the piston 14 and the other in rod 16. See FIG. 3. The retainer 40 in turn is held by a keeper member 42 which is held by a machine screw 44 which is threaded into an opening in piston 14 and torqued sufficiently to hold it in position. FIG. 4 is a fragmentary view along the lines 4—4 of FIG. 3 showing an end view of the parts comprising the arrangement for retaining the piston on the rod.

A suitable seal, such as "O" ring 48 located in internal groove 50 in the piston and bearing against the outer surface of rod 16, is utilized to prevent leakage between the variable volume fluid chambers at the opposite ends of the piston through the screw connection 28.

At the rod end of the motor a gland assembly, indicated generally at 52, is provided for retaining the rod in alignment as it reciprocates back and forth during operation. Included in the gland assembly 52 is a bearing member 54 which is secured to cylinder 12 by means of a screw connection at 56. Connection 56 utilizes buttress type threads which prevents the gland member 54 from unscrewing out of the cylinder 12 even under extreme conditions of operation. A seal 58 is provided to prevent leakage of hydraulic fluid out through the screw connection 56. An "O" ring 59 is provided at the outer end of the threads 56 to prevent contaminants from entering the gland assembly.

The gland assembly 52 illustrated also includes a plate 60 which is connected to gland member 54 by means of machine screws 62 through a member 64. The rod 16 extends through the opening in the gland bearing member 54 with a clearance which is discussed in greater detail hereafter, it being understood that gland bearing member 54 provides lateral support for rod 16. A seal 66 and an anti-extrusion back up member 68 may be located inwardly of plate 60 and a wiper member 70 externally of plate 60 as shown in FIG. 3.

A ring 72 on rod 16 is provided as shown in FIG. 3 between gland member 54 and piston 26 to limit the movement of the piston toward the rod end to the position illustrated in FIG. 3, and permit free passage for fluid to and from conduit 24 as well as provide an adequate minimum retainment.

In prior constructions in which it has been attempted to secure the piston rigidly on the rod, to make it in effect integral with the rod, there is almost always a crookedness angle between the piston and rod assembly and the cylinder because of the manufacturing tolerances and eccentricities which are always present except possibly in a very rare case when they might cancel each other out. This crookedness angle is illustrated by the angle E in FIG. 5 of the drawing which shows diagrammatically in exaggerated form a prior construction in which the piston is secured rigidly on the rod by means of a nut 74 as explained previously. Those parts in FIG. 5 which correspond to like or similar parts in the earlier figures bear the same identifying numbers with an "a" added.

The crookedness angle E in FIG. 5 is indicated between the centerline 76 of the cylinder and the centerline 77,78 of the rod and piston. Such angle is at the maximum at the minimum retainment position which is illustrated in FIG. 5 and tends to produce abnormal distribution of lateral forces by the piston and/or the wear rings on the inner surface or barrel 13 of the cylinder at the locations indicated at 80 and 82 in FIG. 5. As explained later, the numeral 77 indicates the centerline of the rod and 78 the centerline of the piston, but in FIG. 5 these two centerlines are shown as coinciding.

FIG. 6 shows in an enlarged and exaggerated view the ultimate result of such abnormal distribution of forces, at location 82, namely, the abnormal wearing of the wear strip 34a and the retaining lip of the piston indicated at 33.

Figure 10:
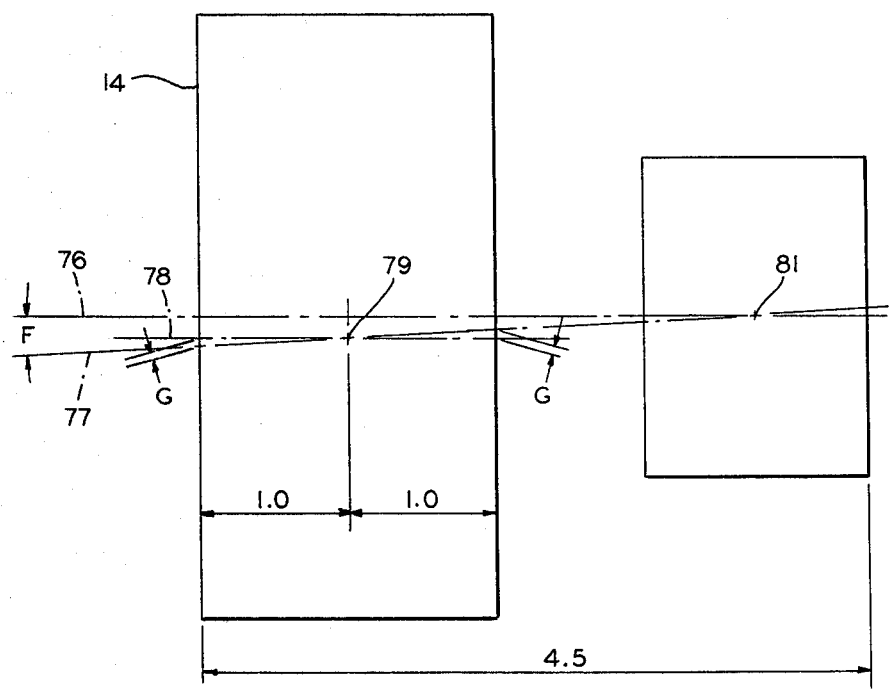
FIG. 10 is a diagram which is illustrative of the present invention.

FIG. 7 shows a diagrammatic view of the present invention in which the piston rod has the same crookedness angle as in FIG. 5 but the centerline 78 of the piston remains parallel with the centerline of the cylinder so that there is no abnormal distribution of side forces between the piston and the surrounding cylinder, thus eliminating wear of the type illustrated in FIG. 6. In FIG. 7 centerlines 76 and 78 for the cylinder and the piston respectively are shown as coincident, because of the small scale, but they actually are parallel as illustrated in FIG. 10.

The manner in which this abnormal distribution of side forces is eliminated is explained by the following illustration having reference to FIG. 8 which shows a diagram of the key parts of a linear fluid motor in accordance with the present invention having a nominal barrel or inside diameter of the cylinder of 4 inches and a nominal outside diameter of the piston rod of 2 inches. Other dimensions for this particular motor are shown in inches in FIG. 8. The following shows how the crookedness angle is calculated in this typical case and how the thread connection between the piston and rod is dimensioned and proportioned to overcome the effect of such crookedness angle, and reference should be had to FIGS. 9 and 10.

These calculations show how the maximum crookedness angle is determined for this typical fluid motor utilizing dimensions and tolerances which are normal and attainable in the circumstances. All of the dimensions shown are in inches. In the following it will be understood that the double dimensions in each case indicate the range or tolerance for each which is acceptable in typical manufacturing procedures. For example, the outside diameter of the grooves in the piston for the wear rings can vary from 3.768 inches to 3.766 inches and be acceptable. "O.D." means outside diameter and "I.D." means inside diameter.

Figure 9:
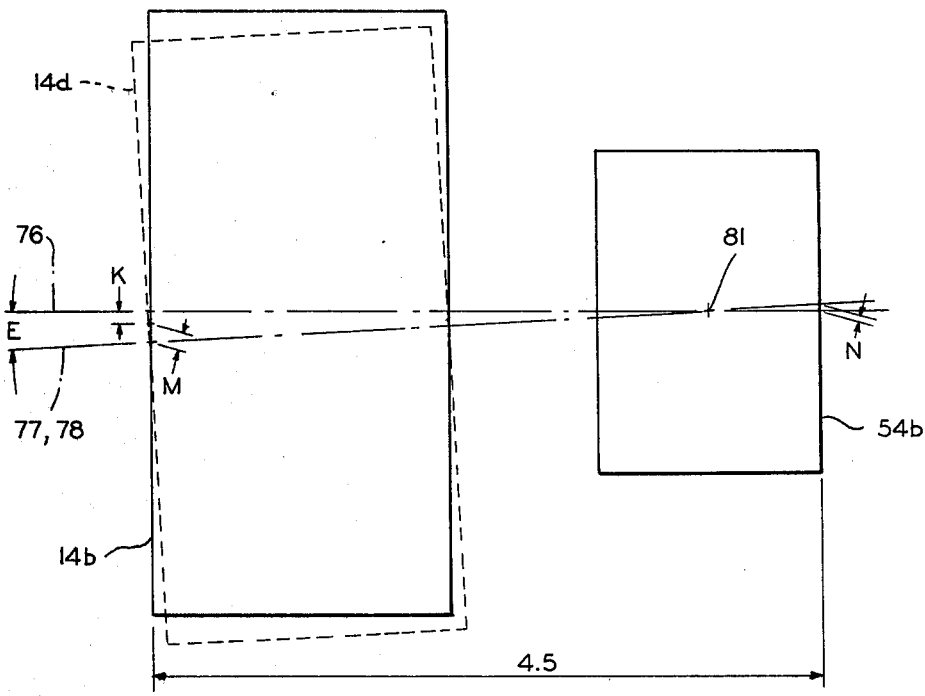
FIG. 9 is a diagram which is illustrative of the prior art.

In order to calculate the maximum crookedness angle which could occur it is necessary to determine two maximum drop or raise dimensions and the maximum total eccentricity. Reference should be had to FIG. 9 which is a diagram illustrating in a greatly exaggerated manner the prior art construction of FIG. 5. In FIG. 9 as in FIG. 5 the centerline 77 of the rod and centerline 78 of the piston are shown as coincident and the piston is shown at 14d in FIG. 9 in dashed lines to illustrate this; that is, the piston is illustrated as cocked at the maximum crookedness angle. It will be appreciated that actually the maximum crookedness angle is not perceptible.

The maximum center drop M, indicated in FIG. 9 at the left end of piston 14, is determined as follows:

| Piston Groove O.D. | = | 3.768 − 3.766 |
| 2 × wear ring thickness | = | .250 − .244 + |
| Piston O.D. | | 4.018 − 4.010 |
| Barrel I.D. | = | 4.025 − 4.021 |
| Piston O.D. (from above calculation) | = | 4.010 − 4.018 − |
| Max. Clearance | = | .015 − .003 |
| Max. Center Drop-(½ Clearance) | = | .0075 − .0015 = M |

The maximum center raise, indicated at N in FIG. 9 at the right end of gland member 54, is determined in accordance with the following calculation:

| Gland Bore | = | 2.004 − 2.002 |
| Rod O.D. | = | 1.998 − 2.000 − |
| Max. Clearance | = | .006 − .002 |
| Max. Center Raise (½ Clearance) | = | .003 − .001 = N |

The other dimension needed in calculating the maximum crookedness angle, reflecting eccentricity, is determined in accordance with the following:

Each of the following T.I.R.'s (total indicated readings of eccentricities) = .003
1. Piston wear ring groove to threaded bore of piston.
2. Rod thread to rod O.D.
3. Gland thread to gland bore.
4. Barrel thread to cylinder bore.
 4 × .003 = .012 T.I.R. maximum
 or .006 off center = K The "K" calculated above is illustrated graphically in FIG. 9 as being additive with "M", and also additive with "N" inasmuch as "N" is above the centerline of the cylinder, but on the opposite side of the crossover point 81 of the centerlines, whereas the other two amounts are below. The foregoing amounts are utilized in determining the maximum crookedness angle in accordance with the following formula:

Tangent $E$ max. =
$$\frac{M + N + K}{P} = \frac{.0075 + .003 + .006}{4.5} = .00367$$

Maximum crookedness angle = 0.21°

In the above formula $P$ equals the distance between the extremeties of the bearing surfaces in the minimum retainment position of the motor. That is, the distance between 14b and 54b as shown in FIGS. 5, 8 and 9. It is assumed for this purpose that the extreme portion of the piston as indicated by the retaining lip at 33 in FIG. 6 is in contact with the barrel 13 of the cylinder.

It will be appreciated that ordinarily the crookedness angle will be less than the maximum. The maximum will occur only rarely when all of the variances and eccentricities are cumulative and are maximum at the same time. This maximum crookedness angle is the maximum angle which a conventional piston and rod assembly might have with respect to the cylinder in the minimum retainment position, it being understood that this applies when it is attempted to secure the piston rigidly on the rod so they act as an integral member whereby the centerline of the piston always coincides with the centerline of the rod.

In the present invention the rod is permitted to pivot relatively to the piston through a pivot angle which is always more than a predetermined crookedness angle, so that the centerline of the piston is allowed always to remain parallel to the center line of the cylinder even though the centerline of the rod moves.

In the fluid motor disclosed herein sufficient pivotal movement is provided between the rod and piston to compensate for the maximum crookedness angle, that is, a pivot angle greater than the maximum crookedness angle is provided. Such pivot angle is indicated at "F" in the diagram of FIG. 10.

In the present fluid motor the following standard threads, which appear in the 15th Edition of the Machinery Handbook by Erik Oberg and F. D. Jones published by the Industrial Press, New York, N.Y., were initially considered for use as the internal threads 30 in the piston and the mating external threads 32 on the rod respectively.

Piston Internal Thread 1.75-8UN-2B

| Major Dimension | Pitch Diameter | Minor Dimension |
|---|---|---|
| 1.750 | 1.6786 − 1.6688 | 1.6297 − 1.6147 |

Piston Rod External Thread 1.75-8UN-2A

| Major Dimension | Pitch Diameter | Minor Dimension |
|---|---|---|
| 1.7477 − 1.7327 | 1.6665 − 1.6590 | 1.5943 |

Clearances, if the above specified standard threads were used would be as follows:

| Major Dimension | Pitch Diameter | Minor Dimension |
|---|---|---|
| .0023 − .0173 | .0023 − .0196 | .0204 − .0354 |

The foregoing threads might be sufficient in some circumstances but they would not allow for sufficient pivoting action between the piston and rod to exceed and thereby completely compensate for the maximum crookedness angle. Accordingly, changes were made in the threads 32 on the rod.

For an understanding of the manner in which the proper thread dimensions and proportions are selected refer to FIG. 10 of the drawing. It is assumed in the present case that the effective pivot center between the rod and piston is midway between the two end surfaces of the piston as indicated at 79 in FIG. 10. If the angle "F" indicated in FIG. 10 is greater than the maximum crookedness angle "E" the movement of centerline 78 with respect to centerline 77 when the motor is in the minimum retainment position, as indicated at "G" in FIG. 10, is sufficient to exceed what would otherwise be the maximum crookedness angle and therefore more than compensate for it. This construction permits the centerline 78 of the piston to remain parallel to centerline 76 of the cylinder at all times and thereby prevent the abnormal distribution of lateral forces by the piston on the cylinder which results from a rigid connection of the piston to the rod.

The threads tentatively selected for this motor would provide for a minimum movement of 0.0023 as indicated by the above clearance. However, since the pivot point is assumed to be midway between the ends of the piston movement "G" of the ends of the piston would be determined as follows:

2 G = 0.0023 and

G = 0.00115

In the present construction in order to fully compensate for the maximum crookedness angle it is necessary to provide movement greater than 0.00367 at each end of the piston, that is, G > 0.00367.

Such minimum movement is determined by multiplying the distance between pivot center 79 and the end of the piston, which is 1 inch, by the tangent of angle E, thus 1 × 0.00367 = 0.00367 inches The desired minimum pivotal movement of the rod relative to the piston can be accomplished by rolling the external piston rod thread 0.00367 − 0.00115 = 0.00252 or, nominally, 0.003 deeper. The rod thread O.D. also is reduced by 0.006. This changes the piston thread dimensions and clearances to the following:

| Major Dimension | Pitch Diameter | Minor Dimension |
|---|---|---|
| 1.7417 − 1.7267 | 1.6605 − 1.6530 | 1.5883 |
| New Clearances: | | |
| .0083 − .0233 | .0083 − .0256 | .0264 − .0414 | thus providing that "G" is a minimum of 0.0083 divided by 2 or 0.00415. This exceeds the amount of 0.00367 which is necessary to more than compensate for the maximum possible crookedness angle.

In this instance, rolling the threads on the piston rod only 0.003 deeper enables sufficient clearance between the mating threads to compensate for the maximum possible crookedness angle as defined hereinbefore when all variances and eccentricities are assumed to be cumulative and at their maximum values.

It will be appreciated that it is not necessary in utilizing the present invention always to compensate for the maximum possible crookedness angle, especially since the maximum occurs only rarely. In the interest of reducing costs, in recognition of the fact that some linear motors are subjected to less severe duty than others, and other factors, it will be appreciated that the mating threads can be dimensioned and proportioned to compensate for a predetermined crookedness angle less than the maximum.

It will be appreciated also that it is necessary in the construction described and illustrated herein to provide sufficient clearances for the locking pin 40, the grooves in which it is located, and other associated parts to make certain that there is no interference by this portion of the structure with the pivotal movement of the rod relative to the piston through the pivot angle. The pivot angle is maximum at one extreme position of the motor, which is also the minimum retainment position of FIG. 3, while the pivot angle is minimum at the other extreme position of the motor illustrated in FIG. 1.

In the structure disclosed herein the rod is enabled to pivot with respect to the piston, with such pivoting occurring in the threaded connection 30,32, through a pivot angle sufficient to more than overcome the maximum or a predetermined crookedness angle, even at the point of minimum retainment. This prevents or reduces abnormal distribution of lateral forces by the piston on the cylinder member during normal reciprocal operation of the motor and thereby minimizes wear and other deleterious effects of such abnormal distribution and prolongs the life of the motor. An indicated in FIG. 7 the portions of piston 14 on either side of seal 48 have sufficient clearance relative to rod 16 to permit the pivoting movement of rod 16 with respect to piston 14.

It will be understood that the present invention is not limited to the particular linear motor structure disclosed but is applicable to other equivalent structures. For example, it is possible to omit wear rings 34 and 36 and their corresponding grooves 35 and 37 in the piston 14, and utilize instead wear surfaces which comprise or are integral with the outer cylindrical surface of the piston. In such a case, the calculation of the maximum crookedness angle and the desired predetermined pivot angle of the shaft is changed accordingly.

Another way in which the structure can be modified while still utilizing the present invention is to provide a different structure for connecting the bearing member 54 to the cylinder 12, and adjusting the formula for calculating the crookedness angle accordingly by omitting or changing the portions relating to the threaded connection 56.

It will be understood that the crookedness angle referred to herein can occur in any plane and is not limited to the single plane shown in the drawing for purposes of illustration. The pivot connection provided by the threaded connection 28 adapts to a crookedness angle in any plane. If the effective pivot point is not centered as indicated at 79 in FIG. 10 then an appropriate adjustment should be made in determining the pivot angle.

While I have described and illustrated herein the best mode contemplated for carrying out my invention it will be appreciated that modifications may be made. Accordingly, it should be understood that I intend to cover by the appended claims all such modifications falling within the true spirit and scope of my invention.

I claim:

1. A linear fluid motor comprising an outer cylinder member, a piston of circular cross section movable reciprocally within said cylinder member in sealing relation therewith, a piston rod secured to the said piston by a screw connection comprising internal threads on the piston and mating external threads on the piston rod, the said two sets of threads being proportioned and dimensioned to allow pivotal movement of said piston rod relative to said piston during reciprocation through a pivot angle sufficient to exceed a predetermined crookedness angle between said piston and said rod dependent upon the manufacturing tolerances for the piston and the rod.

2. A linear fluid motor as in claim 1 including a retainer located in mating grooves in said piston and said rod for preventing unscrewing movement of the piston on the rod.

3. A linear fluid motor as in claim 1 having a gland assembly at one end of said outer cylinder member, said gland assembly including a bearing member providing lateral support for said rod, and the manufacturing tolerances of said gland assembly being included in ascertaining said predetermined crookedness angle.

4. A linear fluid motor as in claim 3 in which the centerline of said outer cylinder member and said piston are approximately parallel during all positions of the motor, the centerline of said rod changing its angle from the said pivot angle at one extreme position of the motor to approximately parallel to the other said centerlines at the other extreme position.

5. A linear fluid motor comprising an outer cylinder member, a piston of circular cross-section movable reciprocally within said cylinder member in sealing relation therewith, a piston rod secured to said piston by a screw connection comprising internal threads on the piston and mating external threads on the piston rod, a gland assembly at one end of said outer cylinder member, said gland assembly including a bearing member for said rod in sealing relation therewith, the said mating threads on said piston and said rod being proportioned and dimensioned to allow pivotal movement of said piston rod relative to said piston during reciprocation through a pivot angle sufficient to exceed a predetermined crookedness angle between said piston and said rod, the said crookedness angle being dependent upon the maximum cumulative manufacturing tolerances of said outer cylinder in relation to said piston and said gland assembly and said rod in relation to the piston and the gland assembly.

6. A linear fluid motor as in claim 5 in which the maximum crookedness angle between the piston and said rod is determined in accordance with the following formula:

$$\text{Tangent } E \text{ max.} = \frac{M + N + K}{P}$$

where $E$ is the maximum crookedness angle, $M$ is a factor dependent upon the tolerances between the barrel of the cylinder and the outside diameter of the piston, $N$ is a factor dependent upon the tolerances between the bore of the gland bearing member and the outside diameter of the rod, $K$ is a factor dependent upon the eccentricities of the said screw connection in relation to both the outside diameter of the piston and the outside diameter of the rod, and $P$ is dependent upon the distance between the outer extremes of the bearing surfaces of the piston and the gland bearing member at the minimum retainment position of the motor.

* * * * *